Sept. 9, 1924. Re. 15,910
A. C. BERRY
CHILD'S AND LADY'S GARMENT
Original Filed Feb. 29, 1916
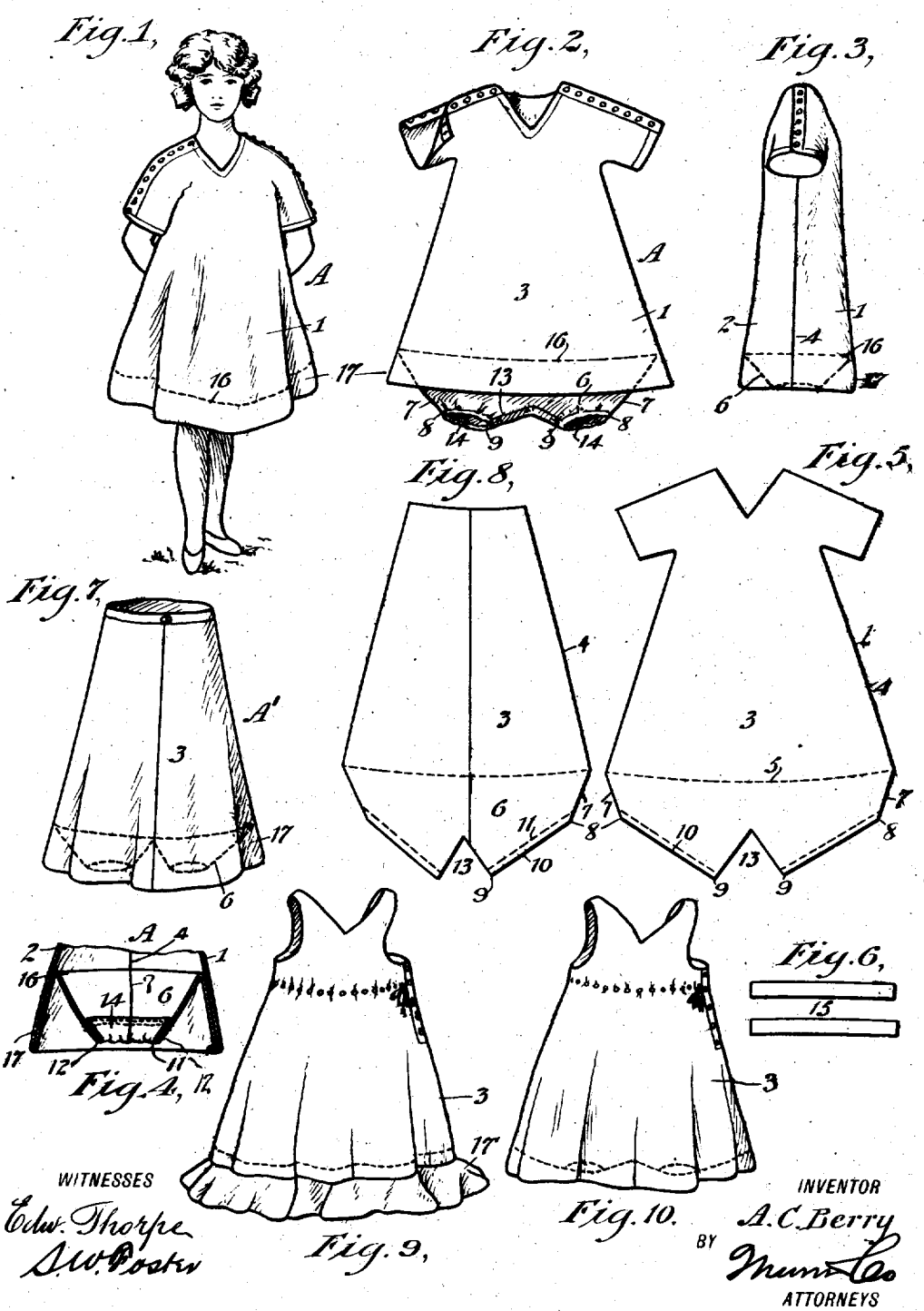
WITNESSES
Edw. Thorpe
S. W. Foster
INVENTOR
A. C. Berry
BY
Munn & Co.
ATTORNEYS Reissued Sept. 9, 1924. Re. 15,910

UNITED STATES PATENT OFFICE.

ANNE COLLINS BERRY, OF NEW YORK, N. Y.

CHILD'S AND LADY'S GARMENT.

Original No. 1,369,761, dated February 22, 1921, Serial No. 81,297, filed February 29, 1916. Renewed July 20, 1920. Serial No. 397,705. Application for reissue filed September 14, 1921. Serial No. 500,720.

*To all whom it may concern:*

Be it known that I, ANNE COLLINS BERRY, a citizen of the United States, and a resident of the city of New York, Winfield, borough of Queens, in the county of Queens and State of New York, have invented certain new and useful Improvements in Children's and Ladies' Garments, of which the following is a full, clear, and exact description.

This invention relates to union garments in the form of an outside piece of apparel or a piece of underwear, a night-dress or the like, and the invention has to deal particularly with the portion of the garment covering the body from the waist down to the knees, and embodies essentially a novel pattern of skirt and bloomer legs so designed that a neatly appearing garment is produced with a minimum of material and without bulkiness at the bloomer legs, whereby comfort and freedom of motion is obtained, as well as the proper set of the skirt. The new combination of bloomer legs and skirt lends itself to a variety of forms of garments and the bottom of the skirt can be finished with a flounce, or made without a flounce, in either case the bottom of the skirt will hang gracefully as if the skirt were cut from an ordinary pattern without bloomer legs attached.

For a more complete understanding of the invention reference is to be had to the following description and claims taken in connection with the accompanying drawing, which illustrates certain embodiments of the invention and wherein similar characters of reference indicate corresponding parts in all the views, in which—

Figure 1 is a perspective view of a dress shown on the figure of a child;

Figure 2 is a front view of the dress spread out flat;

Figure 3 is a side view of the dress as when it is on a child;

Figure 4 is an enlarged vertical section of the lower portion of the garment;

Figure 5 is a plan view of the front or rear section of the union garment shown in Figure 1;

Figure 6 is a view showing the straight pieces forming the placket between the leg holes;

Figure 7 is a view showing a combined skirt and bloomer garment;

Figure 8 is a plan view of one of the sections from which the garment shown in Figure 7 is made;

Figure 9 is a view of an undergarment with a flounce extending around the bottom thereof; and Figure 10 is a view of an undergarment without a flounce.

It is to be understood that the invention which relates to the lower part of a garment and bloomer legs combined therewith, can be embodied as a dress, as shown in Figure 1, a skirt garment, as shown in Figure 7, or as an undergarment, as shown in Figures 9 and 10, and, furthermore, the invention can be embodied as a bathing suit, night-dress, etc.

Referring to Figures 1 to 5, inclusive, the garment A is preferably composed of front and rear sections 1 and 2, each of which may be made from a single piece of goods or a plurality of pieces sewed together. Each section embodies a skirt portion 3, that diverges downwardly from the armpits in the type of garment shown in Figures 1, 2 and 3 or from the waistband in the type A′ shown in Figure 7, and from the bottom of the skirt portion, indicated by the curved dotted line 5, the garment section continues into the portion 6 that forms the front or rear portion of the bloomer legs.

The bloomer leg portion 6 has its side edges 7 converging downwardly from the line 5 to the points 8, from which the edges of the bloomer leg portions converge abruptly to the points 9. The converging edges 7 of the two sections are sewed together to form the side seams of the bloomer legs, and the edges 4 of the sections are sewed together to complete the skirt. The abruptly converging edges 10 are not sewed together, so as to form the leg openings of the garment. The edges 10 are folded back along the lines 11 into hems for receiving an elastic or draw string 12, shown in Figure 4, whereby the bloomer legs can be snugly fitted around the limbs of the wearer, or, if desired, the bloomer legs can be left free or open which is especially desirable in the case of drawers. The part 13 between the leg openings 14 constitutes a placket. To form this placket the front and rear sections may have a central inverted V-shaped recess 13 cut therein, although this particular shape is not absolutely necessary. Along the edges of the recess 13 or the portion between the leg openings each section of the garment has sewed thereto straight pieces of goods 15. These straight pieces afford an adequate foundation for buttons and buttonholes, whereby the part of the garment between the legs can be buttoned and unbuttoned. In a union garment constructed in the manner disclosed the bloomer leg openings are close together and there will be a minimum bulk of material between the legs of the wearer, and, furthermore, the outer portions of the bloomer leg openings will lie inwardly from the bottom edge of the skirt, which will hang in a fold on the circular line 5. The graceful hang of the skirt portion of the garment is obtained by the front and rear sections being of greatest length at the center, by the rear section being slightly longer than the front section, according to the size of the wearer, and by the side portions of the bloomer legs converging downwardly and by the curved line 5 on which the material is folded forming the lower edge of the skirt portion. A hem 17 is formed around the bottom of the skirt by the folding of the bloomer legs upwardly into the skirt and securing them to the skirt by a line of stitching 16 parallel with the curved line 5 of the fold. The hem 17 thus formed has a curved lower edge which extends entirely around the skirt and overhangs the bloomer legs in spaced relation thereto. By this construction the skirt hangs properly and as gracefully as a skirt without bloomers. In addition to the hem, a ruffle or flounce 17′, as shown in Figure 9, can be sewed to the bottom of the skirt. The garment shown in Figure 10 is similar to that shown in Figure 9 without the flounce. The hem can be "let out" or made narrower from time to time in order to lengthen the garment as the wearer grows.

I claim:

1. A garment, comprising a skirt and bloomer legs, the bloomer legs being integral with the skirt and the lower end of the skirt formed by folding the intermediate portion of the garment on a curved line to form a circular tuck or hem which extends entirely around the skirt and overhangs the upper portion of the bloomer legs in spaced relation thereto.

2. A garment comprising a skirt and bloomer legs, said garment being made of similar front and back skirt and bloomer leg sections, and having the side edges of the said skirt sections sewed together, and the side edges of the bloomer leg sections sewed together, the skirt sections being of greatest length at the center and folded on a curved line and sewed to form a circular hem extending around the bottom of the skirt portion and overhanging the bloomer legs in spaced relation to the upper portions thereof.

3. A union garment comprising a skirt flaring downwardly, and bloomer legs connected with the bottom portion of the skirt, there being a placket extending from the inner side of one bloomer leg opening to the inner side of the other bloomer leg opening, and fasteners for closing the placket, said garment being made of similar front and back skirt and bloomer leg sections, and having the side edges of said skirt sections sewed together and the side edges of the bloomer leg sections sewed together, the sections being folded on a curved line and sewed to form a circular tuck or hem at the bottom of the garment which overhangs the bloomer legs, the bloomer legs being so constructed that when the garment is worn, the bloomer legs cover the bottom opening of the skirt, and fasten around the wearer's legs.

4. A garment including a skirt and bloomer legs, and having a placket extending from the bottom edge of one bloomer leg to the crotch, and from the crotch to the bottom edge of the other bloomer leg, strips of straight material stitched along the edges of the placket, and fastening means on the strips for closing the placket, the bloomer legs of the garment being so constructed that when the garment is worn the bloomer legs hang down from the skirt with their lower ends fastened around the wearer's legs above the knees.

5. A union garment comprising a skirt, and bloomer legs connected with the bottom portion of the skirt, said bloomer legs open at their lower ends, there being a placket extending from the inner side of one bloomer leg opening to the inner side of the other bloomer leg opening, and fasteners for closing the placket, said garment being made of similar front and back skirt and bloomer leg sections the skirt sections sewed together at their side edges, and the bloomer leg sections sewed together at their side edges, and having the side edges of the said skirt sections diverging downwardly, and the side edges of the bloomer leg sections converging downwardly, the sections being folded on a curved line, and sewed to form a circular tuck or hem at the bottom of the garment which overhangs the bloomer legs, the bloomer legs being so constructed, that when the garment is worn, the bloomer legs hang down from the skirt portion with their lower ends fastened around the wearer's legs above the knees.

6. A garment, including a skirt and bloomer legs, said garment being made of sections sewed together and having its greatest length at front and back, the bottom of the skirt section being folded to form a hem having a curved lower edge, said hem extending around the entire garment and overhanging the bloomer legs in spaced relation.

7. A garment, including a skirt and bloomer legs, the bloomer legs being integral with the skirt, the lower portion of the skirt carrying the bloomer legs being folded upwardly in the skirt, and sewed thereto on a line parallel with the bottom line of the skirt to form a hem extending completely around the skirt and overhanging the upper portions of the bloomer legs in spaced relation thereto.

8. A union garment including a skirt and bloomer legs, said garment having at the bottom of the skirt a hem from the upper inner portion of which the bloomer legs extend, said hem having a curved lower edge, and extending entirely around the garment and overhanging the bloomer legs.

9. A combination garment including skirt sections and bloomer leg sections, the bloomer leg sections being continuations of the skirt sections, the skirt sections and bloomer leg sections being folded and stitched on a line between said skirt sections and bloomer leg sections, thereby making a tuck which forms a hem that overhangs the bloomer leg sections.

10. A garment including a skirt and bloomer legs, the bloomer legs being integral with the skirt, the lower portion of the skirt carrying the bloomer legs, being folded upwardly in the skirt, and sewed thereto on a line parallel with the bottom line of the skirt to form a hem extending completely around the skirt and overhanging the bloomer legs in spaced relation thereto.

ANNE COLLINS BERRY.